United States Patent [19]

Gugsch

[11] Patent Number: 5,718,418
[45] Date of Patent: Feb. 17, 1998

[54] ACTIVE VIBRATION-ABSORBER

[75] Inventor: Mathias Gugsch, Dearborn, Mich.

[73] Assignee: Metzeler Gimetall AG, Breuberg, Germany

[21] Appl. No.: 645,256

[22] Filed: May 13, 1996

[30] Foreign Application Priority Data

May 13, 1995 [DE] Germany ............ 195 17 630.8

[51] Int. Cl.$^6$ .................................................. F16F 15/00
[52] U.S. Cl. .................... 267/140.14; 188/267; 335/222; 335/277
[58] Field of Search .................. 267/140.14, 140.15; 188/267, 378; 335/213, 214, 216, 222, 258, 277

[56] References Cited

U.S. PATENT DOCUMENTS

| | | | |
|---|---|---|---|
| 4,698,608 | 10/1987 | Kimble | 335/222 |
| 4,873,401 | 10/1989 | Ireland | 335/205 |
| 5,249,782 | 10/1993 | Ide et al. | 267/140.14 |
| 5,277,409 | 1/1994 | Goto et al. | 267/140.14 |
| 5,333,846 | 8/1994 | Goto et al. | 267/140.14 |
| 5,344,129 | 9/1994 | Ide et al. | 267/140.14 |
| 5,366,211 | 11/1994 | Hamada et al. | 267/140.14 |
| 5,492,312 | 2/1996 | Carlson | 267/140.14 |
| 5,594,401 | 1/1997 | Dorri et al. | 335/216 |

*Primary Examiner*—Robert J. Oberleitner
*Assistant Examiner*—Pamela J. Lipka
*Attorney, Agent, or Firm*—Herbert L. Lerner; Laurence A. Greenberg

[57] ABSTRACT

The active vibration-absorber is, in particular, an engine mount for motor vehicles. A magnet system has a magnet casing which receives a permanent magnet and which is guided in the assembly so as to be capable of movement in the axial direction. An electrical moving coil projects perpendicularly from a carrier plate and moves into the magnet casing. The carrier plate can be connected to a vibrating machine part, such as between the engine and the vehicle frame. The magnet system is held, in the axial direction, by a magnetic leakage field which is present between the magnet system and stationary ferromagnet.

15 Claims, 2 Drawing Sheets

ACTIVE VIBRATION-ABSORBER

BACKGROUND OF THE INVENTION

1. Field of the Invention

The invention relates to an active vibration-absorber, particularly for engine mounts in motor vehicles, with a magnet system which has a magnet casing for receiving a permanent magnet, which magnet casing is guided so as to be capable of movement in the axial direction, and with an electrical moving coil which projects down perpendicularly from a carrier plate and moves into the magnet casing; it is thereby possible to connect the carrier plate to a vibrating machine part.

2. Description of the Related Art

An active vibration-absorber of that kind is known from German patent DE-43 01 845 C1. A pot-type magnet is provided in that assembly in which a permanent magnet is disposed. The pot-type magnet is guided at its inner periphery so as to be capable of sliding movement on an axial projection which projects down from a carrier plate. The carrier plate can be connected to a vibrating machine part. An edge region, which is connected to the outer periphery of the pot-type magnet via a press fit, is resiliently disposed on the carrier plate via a spring element made of elastomeric material. An electrical moving coil, which projects down perpendicularly from the carrier plate, moves into an annular gap in the pot-type magnet. By controlling the moving coil, it is possible to reduce the vibrations introduced into the machine part, or to absorb them by introducing a counter-vibration. An alternating current is introduced into the moving coil in dependence on the vibration of the machine part, so that a force is produced between the pot-type magnet and the carrier plate which is supported, in the axial direction, on the mutually adjoining parts, which are suspended in such a way as to be capable of vibrating relative to one another.

Another vibration-absorber has become known heretofore from German patent DE-41 38 405 C1. The magneto-electrical vibration-absorber of that assembly is provided with a pot-shaped casing which serves as an inertia mass and also serves to receive a coil-carrier. A spring element made of elastomeric material is disposed between the additional mass and a ground plate. The spring element is pretensioned by the permanent magnet and the ground plate is brought near until there is only a small spacing. The magnet coil is subjectible with an alternating voltage. Since the gap between the ground plate and the magnet always changes while the device is being used in the intended manner, that prior art vibration-absorber displays non-linear characteristics which are difficult to predict.

A further active vibration-absorber has become known heretofore from German patent publication DE-40 21 039 A1. That vibration-absorber is disposed in an hydraulically-damping engine mount and it forms a decoupling system for high-frequency vibrations. The system can be set in vibration electrodynamically in dependence upon predetermined operating parameters. The vibration-absorber has an annular permanent magnet, which is covered by an elastic diaphragm. An electrical moving coil is fixed to the elastic diaphragm. The coil at the same time encloses a pot-shaped absorbing mass which is likewise connected to the diaphragm and on which yet another absorbing mass can additionally be placed. A sensor is provided for controlling that decoupling system. The sensor is connected to an electrical power supply.

The absorption of vibrations that occur in four-cylinder engines during idling represents a particular problem. The above-noted prior art vibration absorbers have not been found satisfactory, as they do not display linear behavior at operating frequencies of about 20 Hz.

SUMMARY OF THE INVENTION

It is accordingly an object of the invention to provide an active vibration absorber, which overcomes the above-mentioned disadvantages of the heretofore-known devices of this general type; the active vibration-absorber should be light and have small dimensions, and it should display linear behavior throughout its working range.

With the foregoing and other objects in view there is provided, in accordance with the invention, an active vibration-absorber for a vibrating machine part, comprising:

- a carrier plate adapted to be attached to a vibrating machine part;
- a magnet system including a magnet casing movably disposed along an axial direction of the vibration-absorber, a permanent magnet disposed on the magnet casing, and an electrical moving coil projecting away from the carrier plate and moving into the magnet casing; and
- a stationary ferromagnet defining a magnetic leakage field with the magnet system for holding the magnet system in the axial direction.

In accordance with an added feature of the invention, the assembly includes a stationary, central guide bolt extending axially in the magnet casing, the magnet system being guided on the central guide bolt. As a result, accurate vertical guidance of the coil in the magnet gap is ensured, even when transverse forces occur.

In other words, the objects of the invention are satisfied with an assembly in which the magnet system is held, in the axial direction, by a magnetic leakage field which is present between the magnet system and the stationary ferromagnet.

In the vibration-absorber according to the invention, the leakage field of the magnetic circuit is used as a restoring spring. As a result, a restoring force which rises in a linear manner can be produced throughout the operating range. In particular, linear behavior is found at low operating frequencies of about 20 Hz, since an increased power output occurs in the lower frequency range. The vibration-absorber according to the invention is distinguished by low weight and small dimensions, since both the magnet casing and also the permanent magnet serve as an inertia mass. According to the invention, the entire magnet system is mounted so as to be capable of free movement in the axial direction and thus represents the inertia mass, as a result of which the ratio of the overall mass to the inertia mass is optimally utilized.

In accordance with another feature of the invention, there is provided at least one axial bearing for guiding the magnet system on the guide bolt. Any type of suitable bearing may be chosen for guiding the inertia mass system, such as sliding bearings, roller bearings, ball bearings, or any equivalent structure.

In accordance with an added feature of the invention, the restoring force can be adjusted by changing the shape of the stationary ferromagnet. The restoring force may, for example, be changed by using ferromagnets formed with different edge chamfers.

According to one embodiment of the invention, the ferromagnet is a stationary metal ring which surrounds the magnet casing in a spaced-apart relationship. The metal ring is preferably fitted on the outside of a housing shell which consists of magnetically non-conductive material.

The restoring force of the vibration absorber may be adjusted by forming the metal ring with different chamfers.

In other words, one and the same vibration-absorber assembly may be adjusted to different restoring forces by fitting rings of different kinds.

In accordance with again an added feature of the invention, the stationary ferromagnet is a stationary pin which is centrally disposed in the magnet casing. Once again, the restoring force can be varied by forming the pin with different edge chamfers or bevels. The pin is advantageously screwed to parts of the guide bolt. It is thus possible to use pins of different shapes without difficulty.

The vibration-absorber advantageously has a housing shell which surrounds the magnet system in a spaced-apart relationship and which is closed off, at its end faces, with centering caps to which the guide bolt is fixed. In that regard, one of the centering caps includes or is the carrier plate. The housing shell and the centering caps are formed of non-ferromagnetic material.

In accordance with again another feature of the invention, the magnet casing consists of two structural parts which delimit an annular gap for the moving coil. Both parts of the magnet casing are manufactured from ferromagnetic material and they serve as returns for the magnet system.

The moving coil is advantageously attached on the free end of a hollow cylinder which is fixed to the carrier plate.

In accordance with a concomitant feature of the invention, the guide bolt is provided with external threaded regions which serve for fixing the centering caps. The guide bolts expediently project beyond the centering caps in such a way that direct screwing-on bolts for attachment to the motor vehicle body are provided on the top and the bottom of the vibration-absorber.

Other features which are considered as characteristic for the invention are set forth in the appended claims.

Although the invention is illustrated and described herein as embodied in an active vibration-absorber, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
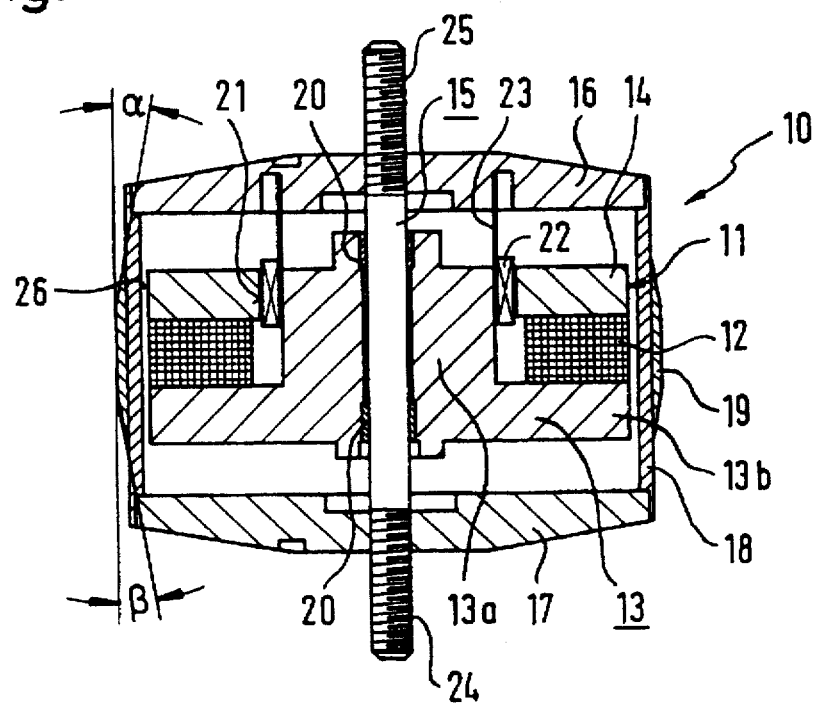
FIG. 1 is a diagrammatic vertical section through a first exemplary embodiment of a vibration-absorber according to the invention.

Referring now to the figures of the drawing in detail and first, particularly, to FIG. 1 thereof, there is seen an active vibration-absorber 10 according to the invention. A magnet system 11 (an inertia mass system) is guided, so as to be capable of sliding movement in the axial direction (vertical in FIG. 1), on a guide bolt 15. The magnet system 11 encompasses a magnet casing 13 which has an approximately T-shaped cross-section. At an internal region 13a of the magnet casing 13 there are provided two mutually spaced-apart axial bearings 20, which interact with the guide bolt 15. The axial bearings 20 may be constructed as sliding bearings, roller bearings, ball bearings, or any equivalent structure.

An external region 13b of the magnet casing 13, which region is oriented in the horizontal direction, serves to receive a permanent magnet 12 on which an annular pole plate 14 rests.

The end regions of the guide bolt 15 are provided with external threads 24 and 25. The external threads 24 and 25 allow fixing mutually spaced-apart centering caps 16 and 17, respectively. Due to the fact that the guide bolt 15 projects above the outer surfaces of the centering caps 16, 17, the threads 24 and 25 at the same time serve as screw-on bolts for attaching the vibration-absorber to the vehicle body. A cylindrical housing shell 18 which, together with the outer periphery of the inertia mass system 11, delimits a gap 26, is received between the centering caps 16, 17. A metal ring 19 which interacts with the inertia mass system 11 is detachably fixed to the outside of the housing shell 18. Different restoring forces of the system may be adjusted by varying edge phases $\alpha$, $\beta$ (chamfers, bevels) provided at the metal ring 19. The metal ring 19 thus is a ferromagnet which defines a magnetic leakage field with the magnet system and thus holds the inertia mass in the axial direction of the assembly.

The pole plate 14, which rests on the upper side of the permanent magnet 12, delimits, together with the internal region 13a of the magnet casing 13, an annular gap 21. A moving coil 22, which is fixed to the free end region of a hollow cylinder 23, moves into the annular gap 21. The hollow cylinder 23 is fixed to the centering cap 16 and projects down perpendicularly from the inside of the latter.

The magnet casing 13 and the pole plate 14 are manufactured from a ferromagnetic material. In addition, the metal ring 19, which is detachably mounted on the outside of the housing shell 18, is also formed of a material of this kind. By contrast, the centering caps 16, 17 and the housing shell 18 are manufactured from a magnetically non-conductive material, for example aluminium.

The moving coil 22 is connected to an electrical power supply unit, of which no further details are illustrated for clarity. Since the moving coil is disposed on the centering cap 16 in a stationary manner, connection to the power supply is made easier.

When the vibration-absorber 10 is installed, the magnet system 11 is statically held in the central position by the leakage field of the magnetic circuit. Furthermore, the leakage field of the magnetic circuit is used as a restoring spring, as a result of which a restoring force that rises linearly can be produced over wide ranges. Under these circumstances, the restoring force can be varied by fitting metal rings 19 having differently angled chamfers $\alpha$, $\beta$.

All of the parts, and particularly the permanent magnet 12 of the inertia mass system 11 which is guided so as to be capable of sliding movement in the axial direction, serve as the inertia mass. In this way, a high inertia mass is achieved with a low overall weight and small dimensions.

Figure 2:
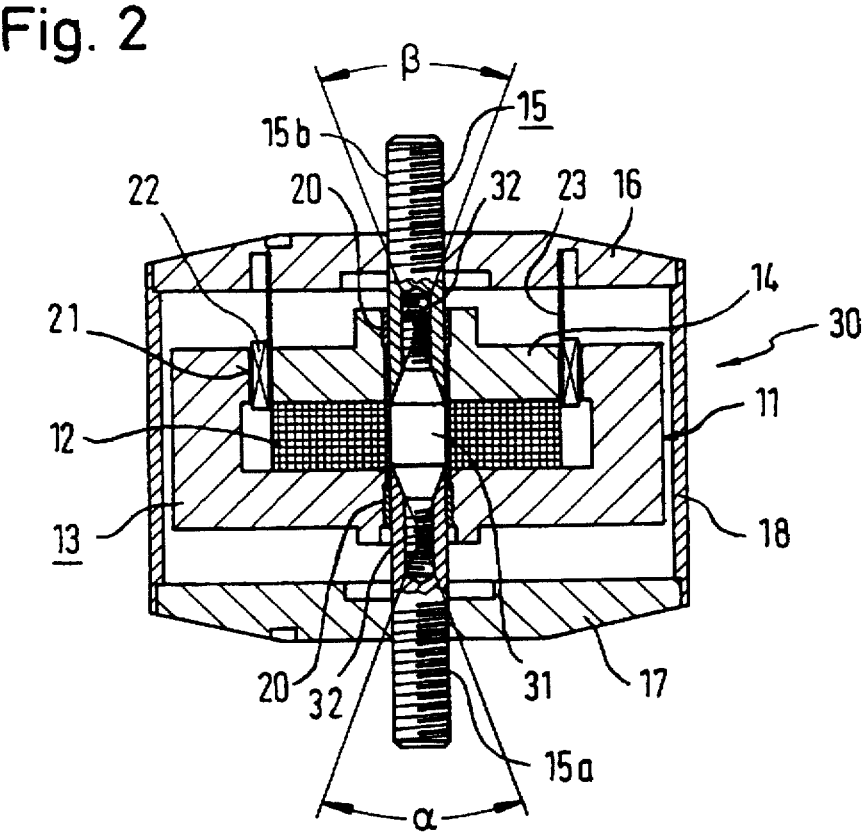
FIG. 2 is a vertical section through a second exemplary embodiment thereof.

With reference to FIG. 2, there is shown a further vibration-absorber 30 according to the invention. The vibration-absorber 30 has a central guide bolt 15 which serves to fix the mutually spaced-apart centering caps 16, 17. A cylindrical housing shell 18 is disposed between the centering caps 16, 17. An inertia mass system 11 is guided on the guide bolt 15 so as to be capable of movement in the axial direction. The magnet system 11 has a magnet casing 13 which is approximately U-shaped in a horizontal section and which serves to receive an annular permanent magnet 12. A pole plate 14 rests on the permanent magnet 12 which, together with the magnet casing 13, delimits an annular gap 21. A moving coil 22, which is disposed at the free end of a hollow cylinder 23, moves into the annular gap 21. The hollow cylinder 23 is attached to the centering cap 16. Axial bearings 20 are provided, around the inertia mass system 11, on the magnet casing 13, and on the pole plate 14. These may be constructed as sliding bearings, roller Rearings, ball bearings, or any equivalent structure.

The essential difference between the vibration-absorber 30 shown in FIG. 2 and the vibration-absorber 10 shown in FIG. 1 is found in the functional design of the ferromagnetic means. In the vibration-absorber 30, the guide bolt 15 has a pin 31 which is provided, at the end faces, with axial screw bolts 32 which, in this instance, represent the ferromagnetic means. The screw bolts 32 are screwed to parts 15a, 15b of the guide bolt. The pin 31, which consists of ferromagnetic material, has the same function as the metal ring 19 of the vibration-absorber 10 shown in FIG. 1. The restoring force of the vibration-absorber 13 can be varied by the use of pins 31 with different edge chamfers α, β. The pins 31 thus define a ferromagnet which establishes a magnetic leakage field with the magnet system and thus holds the inertia mass in the axial direction of the assembly.

Figure 3:
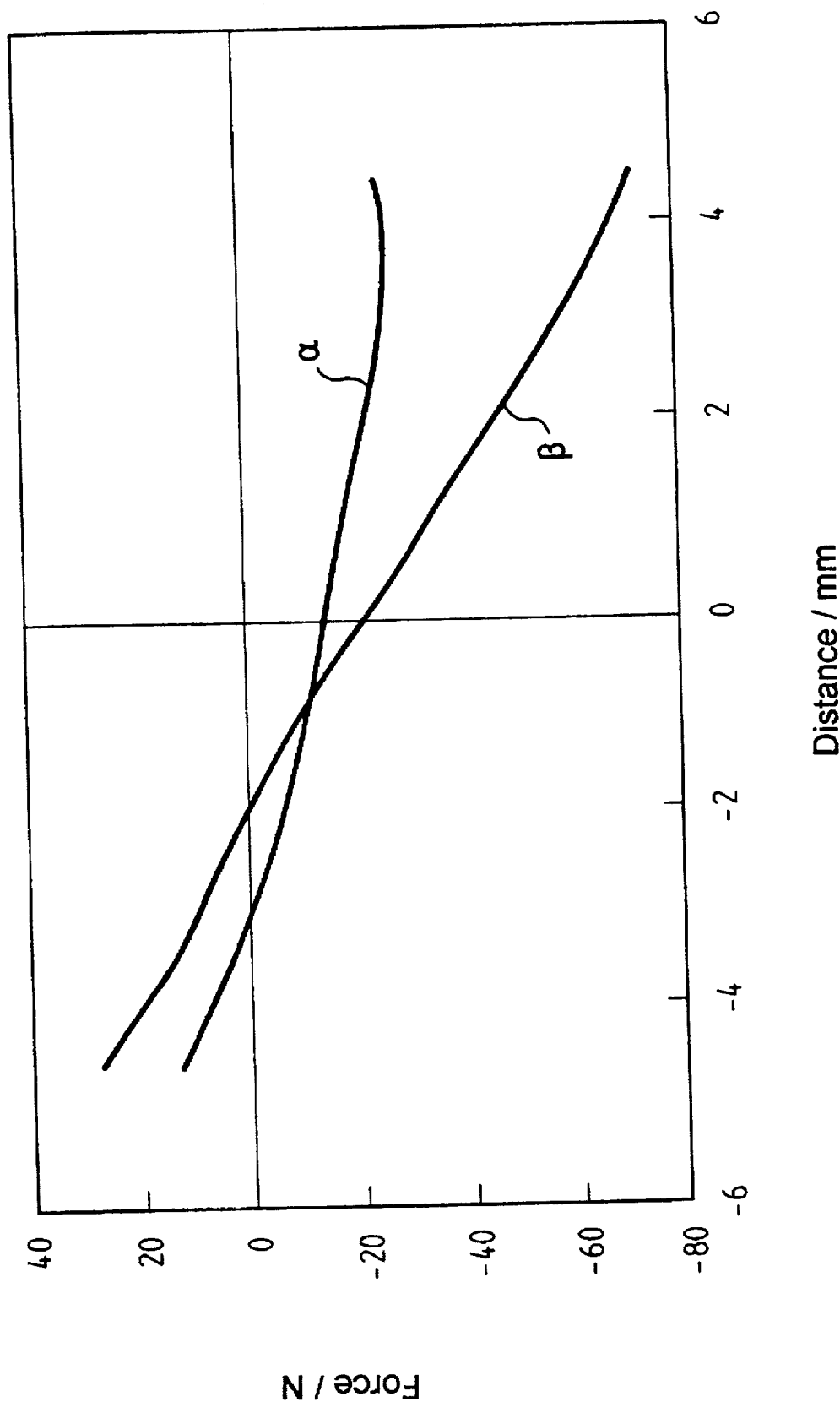
FIG. 3 is a graphical plot of force over travel distance for different phase geometries of the vibration-absorber of FIG. 1

Referring now to FIG. 3, there is shown a graph of the force/travel path characteristics for different edge chamfers α, β of the vibration-absorber 10 shown in FIG. 1. Variation of the restoring force was achieved by installing metal rings with different chamfer angles α, β in vibration-absorbers 10 which otherwise remained identical. A variation of the restoring force which is similar in principle can be achieved in the vibration-absorber 30 shown in FIG. 2 by using pins 31 having different chamfer angles α, β.

The vibration-absorbers 10 and 30 have in common the fact that a lower outer leakage flux and a dust and moisture-tight enclosure of the movable structural parts is achieved. Finally, a further improvement has been conceived for facilitating axial centering of the movable inertia mass system 11. Such can be done by means of a superimposed direct current which is controlled via a second regulating circuit.

I claim:

1. An active vibration-absorber for a vibrating machine part, the vibration-absorber defining an axial direction, comprising:
    a carrier plate adapted to be attached to a vibrating machine part;
    a magnet system including a magnet casing movably disposed along the axial direction of the vibration-absorber, a permanent magnet disposed in said magnet casing, and an electrical coil projecting away from said carrier plate and into said magnet casing;
    a stationary ferromagnet defining a magnetic leakage field with said magnet system for holding said magnet system in the axial direction;
    and a stationary, central guide bolt extending axially in said magnet casing, said magnet system being guided on said central guide bolt.

2. The vibration-absorber according to claim 1, wherein said magnet system further includes an axial bearing for guiding said magnet system on said guide bolt.

3. The vibration-absorber according to claim 1, wherein said stationary ferromagnet defines a restoring force of the vibration-absorber, and wherein the restoring force is adjustable by changing a shape of said stationary ferromagnet.

4. The vibration-absorber according to claim 1, wherein said stationary ferromagnet is a metal ring surrounding said magnet casing and being spaced apart from said magnet casing.

5. The vibration-absorber according to claim 4, including a housing shell of magnetically non-conductive material, said metal ring being fitted on an outside of said housing shell.

6. The vibration-absorber according to claim 4, wherein said metal ring is formed with edge chamfers defining a restoring force of the vibration-absorber.

7. The vibration-absorber according to claim 1, wherein said ferromagnet is a stationary pin disposed centrally in said magnet casing.

8. The vibration-absorber according to claim 7, wherein said pin is formed with edge chamfers defining a restoring force of the vibration-absorber.

9. The vibration-absorber according to claim 7, wherein said pin is screwed to parts of said guide bolt.

10. The vibration-absorber according to claim 1, wherein said carrier plate is a first centering cap, and including a housing shell surrounding said magnet system, and being spaced apart from said magnet casing and a second centering cap, said first and second centering caps closing off said housing shell at end faces thereof, and a guide bolt attached to said centering caps.

11. The vibration-absorber according to claim 10, wherein said housing shell and said centering caps are formed of non-ferromagnetic material.

12. The vibration-absorber according to claim 1, wherein said magnet casing comprises two structural parts delimiting an annular gap for receiving said moving coil.

13. The vibration-absorber according to claim 1, including a hollow cylinder fixed to said carrier plate, said moving coil being disposed on said hollow cylinder distally from said carrier plate.

14. The vibration-absorber according to claim 1, wherein said guide bolt is formed with external threaded regions facilitating attachment thereof to the vibrating machine part.

15. An active vibration-absorber for a vibrating machine part, the vibration-absorber defining an axial direction, comprising:
    a carrier plate adapted to be attached to a vibrating machine part;
    a magnet system including a magnet casing movably disposed along the axial direction of the vibration-absorber, a permanent magnet disposed in said magnet casing, and an electrical coil projecting substantially perpendicularly away from said carrier plate and into said magnet casing; a stationary ferromagnet defining a magnetic leakage field with said magnet system for holding said magnet system in the axial direction and defining an adjustable restoring force of the vibration-absorber;
    a stationary, central guide bolt extending axially in said magnet casing, said magnet casing being guided on said central guide bolt;
    a housing shell surrounding said magnet casing with a spacing therebetween, centering caps closing off said housing shell at end faces thereof and being attached to said central guide bolt; and
    wherein the adjustable restoring force is adjustable by changing a shape of said stationary ferromagnet.

* * * * *